(12) United States Patent
Dorn

(10) Patent No.: US 7,878,528 B2
(45) Date of Patent: Feb. 1, 2011

(54) KNITTED FABRIC COMPRISING INLAID YARNS FOR AIRBAG FLAP

(75) Inventor: Felix Dorn, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 182 days.

(21) Appl. No.: 12/176,833

(22) Filed: Jul. 21, 2008

(65) Prior Publication Data
US 2009/0026740 A1 Jan. 29, 2009

(30) Foreign Application Priority Data
Jul. 26, 2007 (DE) .................. 10 2007 035 073

(51) Int. Cl.
*B60R 21/215* (2006.01)
*B60R 21/20* (2006.01)

(52) U.S. Cl. .................................. 280/728.3

(58) Field of Classification Search ............... 280/728.3
See application file for complete search history.

(56) References Cited

U.S. PATENT DOCUMENTS

| | | | |
|---|---|---|---|
| 3,552,154 A | | 1/1971 | Lesley |
| 4,753,088 A | * | 6/1988 | Harrison et al. ............... 66/202 |
| 5,236,775 A | * | 8/1993 | Swoboda et al. ............. 428/219 |
| 5,299,435 A | * | 4/1994 | Whalley ........................ 66/61 |
| 5,385,784 A | * | 1/1995 | Sasaki et al. ................ 428/369 |
| 5,427,408 A | * | 6/1995 | Ando et al. ............... 280/728.3 |
| 5,564,731 A | * | 10/1996 | Gallagher et al. ......... 280/728.3 |
| 5,639,115 A | | 6/1997 | Kelley et al. |
| 5,941,557 A | * | 8/1999 | Mullins et al. ............ 280/728.3 |
| 6,022,817 A | * | 2/2000 | Lewis et al. .................. 442/189 |
| 6,145,879 A | * | 11/2000 | Lowe et al. ............... 280/743.1 |
| 6,318,752 B1 | * | 11/2001 | Warnecke et al. ......... 280/728.3 |
| 7,100,941 B2 | * | 9/2006 | Riha et al. ............... 280/728.3 |
| 7,748,732 B2 | * | 7/2010 | Sella et al. ............... 280/728.3 |
| 2002/0000711 A1 | * | 1/2002 | Schmidt et al. .......... 280/728.3 |
| 2002/0050046 A1 | * | 5/2002 | Nicholas ...................... 29/428 |
| 2002/0050705 A1 | * | 5/2002 | Gilpatrick et al. ......... 280/743.1 |
| 2002/0060449 A1 | * | 5/2002 | Keshavaraj ............... 280/743.1 |
| 2003/0060103 A1 | * | 3/2003 | Nagaoka et al. ............... 442/59 |

(Continued)

FOREIGN PATENT DOCUMENTS

DE 1 585 079 11/1969

(Continued)

*Primary Examiner*—Paul N. Dickson
*Assistant Examiner*—Barry Gooden, Jr.
(74) *Attorney, Agent, or Firm*—Sughrue Mion, PLLC

(57) ABSTRACT

A hinge for an airbag flap in a motor vehicle. The hinge is formed of a knitted fabric which is connected in a form-fitting manner both to the airbag flap and to regions surrounding the airbag flap. The knitted fabric has a plurality of inlaid or standing yarns arranged at an angle of at least 15° in relation to the longitudinal extension of the hinge-side edge of the airbag flap. Furthermore, a method for manufacturing the hinge is provided where the knitted fabric is arranged in relation to the airbag flap and also the regions surrounding the airbag flap in such a manner that the inlaid or standing yarns are arranged at an angle of at least 15° in relation to the longitudinal extension of the hinge-side edge of the airbag flap. The knitted fabric and at least parts of both the airbag flap and the regions surrounding the airbag flap are sheathed with plastic material so as to form a form-fitting connection.

26 Claims, 3 Drawing Sheets

U.S. PATENT DOCUMENTS

| | | | |
|---|---|---|---|
| 2003/0184058 A1* | 10/2003 | Gray et al. | 280/728.3 |
| 2003/0205888 A1* | 11/2003 | Keshavaraj | 280/730.2 |
| 2004/0077236 A1* | 4/2004 | Ishii et al. | 442/76 |
| 2004/0124620 A1* | 7/2004 | Keshavaraj | 280/743.1 |
| 2004/0164531 A1* | 8/2004 | Riha et al. | 280/732 |
| 2004/0227333 A1* | 11/2004 | Cesar | 280/730.1 |
| 2005/0269804 A1 | 12/2005 | Yamada et al. | |
| 2006/0097539 A1* | 5/2006 | Noisternig et al. | 296/70 |
| 2006/0107701 A1* | 5/2006 | Ternon et al. | 66/195 |
| 2006/0252322 A1* | 11/2006 | DeBenedictis et al. | 442/59 |
| 2007/0040360 A1* | 2/2007 | Riha et al. | 280/728.3 |
| 2007/0248823 A1* | 10/2007 | Moore et al. | 428/398 |
| 2008/0042414 A1* | 2/2008 | Nagaoka | 280/743.1 |
| 2008/0047305 A1* | 2/2008 | Ganzoni et al. | 66/215 |
| 2008/0176051 A1* | 7/2008 | Nguyen et al. | 428/219 |
| 2009/0217484 A1* | 9/2009 | Bittner et al. | 16/223 |
| 2009/0314378 A1* | 12/2009 | Huber et al. | 139/389 |

FOREIGN PATENT DOCUMENTS

| | | |
|---|---|---|
| DE | 2 017 899 | 10/1970 |
| DE | 195 30 346 A1 | 2/1996 |
| DE | 199 35 625 A1 | 2/2001 |
| EP | 1 145 923 A2 | 10/2001 |
| GB | 998289 | 7/1965 |

\* cited by examiner

KNITTED FABRIC COMPRISING INLAID YARNS FOR AIRBAG FLAP

BACKGROUND OF THE INVENTION

1. Field of the Invention

The invention relates to airbag flap hinges, in particular to airbag flap hinges comprising textile inserts sheathed with plastics material, and also to methods for the manufacture thereof.

2. Description of the Related Art

Airbags are used widely, in particular in motor vehicles, to protect vehicle occupants from damage caused by impact from various sides. Thus, it is currently conventional to provide airbags of this type not only in the steering wheel and also the instrument panel in front of the front passenger seat, but also in the door linings, optionally in the roof interior, at the sides of seats or the like. Increasingly stringent demands placed on the appearance of inner lining parts of this type require the airbag, and in particular the total airbag module, consisting of the collapsed airbag, the firing module, if appropriate a firing channel and the required support structures, to be arranged out of sight, within the lining parts and below at least the top decorative layer.

Precisely at those locations where the airbag is bulky and takes up a comparatively large overall space and also at those locations where the airbag is intended, when triggered, to extend over a large area, for example in the region in front of the front passenger seat within the continuation of the instrument panel, it has become established practice to insert what are known as airbag flaps above the airbag within the decorative surface. The airbag flaps perform a plurality of tasks, examples of which include supporting the decorative material above the collapsed airbag and protecting the collapsed airbag from mechanical damage.

In addition, these airbag flaps can, in the event of triggering of the airbag, positively assist the displacement of the decorative materials of the inner lining part in order to assist unfolding of the airbag as freely as possible in the desired direction. In the event of triggering, the decorative material preferably tears along defined tearing lines and the airbag flap preferably folds to a predefined extent about a defined folding axis and clears the path for the airbag as it unfolds.

It was quickly recognized in this regard that particular care must be taken when using flaps of this type to ensure that the flaps neither injure the vehicle occupant nor cause extensive damage in the passenger compartment. Thus, for example, on folding of the airbag in the door armrest region or in the instrument panel, it should be ensured that the airbag flap does not flap down out of the rest position so far that it strikes and possibly damages the windscreen or side window of the vehicle. It must also be ensured that the airbag flaps do not, in the event of triggering of the airbag, become completely detached from the environment and possibly fly unrestrained through the passenger compartment.

Sheet metal hinges, which are arranged between a hinge-side edge of the airbag flap and the surrounding region, are therefore usually inserted in the region of the instrument panel and door linings. These surrounding regions can, for example, consist of a specific frame structure made of plastics material or metal. Conventionally, the sheet metal hinges are joined to the carrier, in the final assembly of, for example, the instrument panel, by joining methods such as hot riveting, ultrasonic welding or using hollow and pop rivets or screwed connections.

Sheet metal hinges of this type are, however, comparatively complex to manufacture, require complex and multistep operations for manufacture and connection and, moreover, conventionally break when subjected to excessive material stresses so as to form sharp edges, thus again significantly increasing the risk of injury to a vehicle occupant in the event of a component failing. In addition, hinges of this type have comparatively high masses, as a result of which energy is consumed during folding-open of the airbag flap, leading either to delayed unfolding of the airbag or to the need for larger dimensions of the propelling charge in the firing module. Both alternatives are however undesirable.

In order to produce a feel and appearance which remains uniform beyond the site of installation, airbag systems of this type are configured in the decorative carrier so as to be integral with the airbag flap and the frame which may surround the flap. An example of this may be inferred from DE 4 437 773 C1.

On account of the drawbacks of sheet metal hinges, other approaches include woven fabric inserts sheathed with plastics material. The sheathing with plastics material allows an intimate and form-fitting bond to the plastics material of the airbag flap and also to the plastics material of the surrounding regions to be achieved. Woven fabric inserts of this type are known, for example, from DE 199 35 625 A1, DE 10 2004 014 423 A1 and EP 1 062 128 B1.

Woven fabrics of this type, which consist in a manner known to a person skilled in the art of interwoven warp and weft yarns arranged substantially perpendicularly to one another, are conventionally arranged in such a way that either the warp yarns or the weft yarns are arranged perpendicularly to the hinge-side edge of the airbag flap. On account of the fact that the forces acting on the woven fabric when the airbag flap is folded down also occur substantially perpendicularly to the hinge-side edge, these woven fabric inserts act substantially just on one type of the woven fabric yarns.

Woven fabrics of this type are described, for example in DE 20206379 U1 and DE 199 35 625 A1, as what are known as "woven fabric nets" which usually contain a plain or leno weave known to a person skilled in the art. These nets, which contain no knotted connection between the warp and weft yarns, allow comparatively simple extraction of individual yarns from the woven fabric. In use as a hinge, this entails the risk of component failure. Use has therefore also been made of a woven fabric in which leno weaves and size application provide a slightly better connection between warp and weft yarns than in the case of an uncoated plain weave.

Tearing of the yarns in the edge region or extraction of individual yarns from the plastics material is nevertheless possible at comparatively low forces below 1 kN.

In addition, force is transmitted between the plastics material parts and the conventional net hinge directly, in a single stage and without further damping properties. This means that in the most favorable case, in which the hinge does not become torn on folding-down of the airbag flap, the hinge absorbs the forces occurring up to its yield point, and above the yield point, diverts the acting forces wholly and without damping into the plastics material of the airbag flap and the surrounding regions.

The above-mentioned DE 202 06 379 U1 therefore describes a reinforcing woven fabric which is inserted at a 45° angle. Practical tests have revealed that on use of a reinforcing woven fabric of this type, an effect is achieved only by those yarns projecting beyond the portion of the hinge region by a distance of at least 20 mm on both sides. This projecting is required as otherwise it is not possible to achieve sufficient securing and thus the transmission of force from the net to the plastics material of the airbag flap and the surrounding regions. Damping of the energy is in this case caused by stretching of the net and slipping of the yarns in the plastics material and thus limits the force transmission of the hinge as a function of the adhesive forces between the yarns of the net and the plastics material surrounding the net. However, this has a direct influence on the security of the flap function and thus on passenger safety.

If, during folding-down of the airbag flap on triggering of the airbag, the maximum admissible tensile force acting on the hinge, and thus on the yarns thereof, is exceeded, the yarns start to slip in the plastics material, wherein conventionally only a very low effect of retaining the yarns in the plastics material may be observed. As a result of this extracting of the yarns, the hinge is again also extended beyond a desired degree, as a result of which the airbag flap, for example in an instrument panel, eventually moves dangerously close to the windscreen. There is also the risk of the yarns becoming completely extracted, leading ultimately to detachment of the airbag flap.

In the case of particularly thick decorative surfaces with, for example, a foam or spacer knitted fabric layer arranged between the decorative carrier and the decorative material, a textile hinge of this type should be fitted as a long loop to ensure folding-open of the airbag cover, as otherwise the forces acting on the hinge would be too great or the opening of the airbag too small, if otherwise the decorative surface itself would have to be deformed on folding-open of the airbag flap. As a result of this fitting of a loop, the cover is first accelerated, after tearing of the decorative surface above the airbag flap, into a translatory movement until the previously fitted loop is tensioned. Only in a further step is the cover forced, by the now tensioned hinge and the bearings of the connection of the hinge in the cover, into a rotatory movement. However, in this very short deflection point there are produced in a particularly short time of approximately 0.3 ms high forces which have to be transmitted directly to the plastics material via the yarns.

In this regard, it must also be borne in mind that the materials used are subject, specifically in the passenger compartment of a motor vehicle, partly owing to powerful solar irradiation, to particularly high changes in temperature. Specifications for temperature change tests carried out by car manufacturers anticipate temperatures in the range of from −35° C. to +85° C.

Obviously, however, the plastics material for the decorative carrier and in particular the decorative material does not have the same material properties over the entire temperature range. On the contrary, the plastics material is comparatively brittle at −35° C. and comparatively soft at +85° C. In the case of brittle plastics material, the yarns tend to become torn out of the plastics material bond; in the case of soft plastics material, on the other hand, the detachment takes place rather by way of extraction or peeling-away of the yarns from the plastics material carrier.

OBJECT OF THE INVENTION

An object of the invention is to provide a hinge for an airbag flap that offers high protection from material failure and, moreover, provides damping in the hinge mechanism. In the case of loop formation, gentle transition from the translatory to the rotatory movement is facilitated.

SUMMARY OF THE INVENTION

An aspect of the invention provides for the use of knitted fabrics comprising inlaid or standing yarns arranged at an angle of at least 15° in relation to the longitudinal extension of the hinge-side edge of the airbag flap. The knitted fabric allows a secure form-fitting connection to the plastics material to be established in a way that cannot be achieved in a conventional plain-weave woven fabric. As a result of its textile looped weave, a knitted fabric is connected in all four directions to the adjacent yarns which allow loads in the 45° direction relative to the direction of the fabric.

A knitted fabric has yarns which intersect at an angle of approximately 45° and are joined together at the point of intersection. A knitted fabric also consists of at least one continuous-filament yarn, the continuous-filament yarns looping at least partly around one another at the points of intersection. During sheathing of the knitted fabric with plastics material, not only can the plastics material be present on the two surfaces of the textile; the meshes of the knitted fabric can also extend around "plastics material webs" between the two plastics material layers on the upper side and underside of the textile. The gaps filled with plastics material in the knitted fabric ensure a form-fitting connection, allowing an additional connecting effect between the textile and plastics material over woven fabrics in which merely adhesive forces act between the yarns and plastics material.

As a result of the rod-like or meshed weave, the knitted fabric grips, in a form-fitting manner, into the plastics material and can be loaded up to the tear strength of the knitted fabric or the plastics material.

The diagonal course of the yarns also allows much higher stretching of the hinge, as a result of which the length of the loop can be reduced and a gentler transition from a translatory movement to a rotatory movement is facilitated when, as described at the outset, a loop is provided.

Stretching is also much greater in knitted fabrics owing to the type of weave, leading to a gentler transition from translation to rotation and thus reducing the forces acting on the knitted fabric and the securing thereof.

In addition, the provision according to the invention of inlaid or standing yarns in the knitted fabric allows the stretchability of the hinge to be controlled in a targeted manner. In combination with the knitted fabric, a hinge which acts in two stages, allows optimum kinetics of the airbag cover, and is securely embedded in the plastics material, may be manufactured.

The two-stage action is achieved as a result of the fact that, in the arrangement according to the invention of the inlaid or standing yarns at an angle of at least 15° in relation to the longitudinal extension of the hinge-side edge of the airbag flap, the inlaid or standing yarns are first tensioned and are extracted, as the force introduced rises, from the plastics material and/or the knitted fabric without the knitted fabric immediately being fully stretched in the loop region. However, as the inlaid or standing yarn increasingly slackens, the knitted fabric stretches and absorbs more and more energy, thus slowing down the inlaid yarn in the plastics material.

Moreover, the form-fitting connection of the yarns of the knitted fabric at the points of intersection allows the knitted fabric to be oriented in all directions without thereby adversely affecting the strength of the knitted fabric or of the hinge manufactured thereby. Only the stretching properties change as a result of the orientation of the knitted fabric with the inlaid yarns arranged therein.

A first aspect of the invention thus provides a hinge for an airbag flap that is particularly simple and cost-effective. In addition, there is no discernible significant influence on the constructional weight. The invention allows a person skilled in the art variably to adjust the properties of the hinge over a particularly broad range by varying the yarn material, yarn strength, yarn tension, mesh width, changing the nature of the knitted fabric, varying the number and/or orientation of the inlaid or standing yarns, differing angular geometries of the mesh structure and the like.

In an exemplary embodiment of the invention, all of the inlaid yarns are arranged substantially parallel to one another. Moreover, uniform spacing of the inlaid or standing yarns within the knitted fabric ensures the provision of the same material properties over the entire width of the hinge according to the invention.

In a further exemplary embodiment of the invention, at least a plurality of the inlaid yarns are arranged substantially perpendicularly to the longitudinal extension of the hinge-side edge of the airbag flap. Particularly when all of the inlaid or standing yarns are arranged parallel to one another, all of the inlaid or standing yarns will be arranged perpendicularly to the longitudinal extension of the hinge-side edge of the airbag flap. This ensures that the above-described gentle transition from translatory to rotatory movement is set as a result of the fact that the forces to be absorbed by the hinge are absorbed at first almost entirely by the inlaid or standing yarns and only then by the knitted fabric.

In this regard, the resistance of the inlaid or standing yarns to at least partial extraction thereof from the knitted fabric should be greater than the force required to introduce substantial longitudinal stretching into the inlaid yarns. This ensures that the inlaid or standing yarns, before being extracted from the knitted fabric, at least partly stretch and thus contribute to a first damping without weakening the bond consisting of the knitted fabric, on the one hand, and inlaid or standing yarns, on the other hand, as early as in this step. Only once at least partial stretching has been introduced into the inlaid or standing yarns, is further damping caused by the hinge as a result of the fact that the inlaid or standing yarns are extracted from the knitted fabric and/or the plastics material and, as a result, the force introduced is increasingly supported by the knitted fabric itself.

Moreover, the inlaid or standing yarns have a coating with a release agent or adhesion promoter via which the setting of the adhesiveness to the sheathed plastics material can be adjusted. A person skilled in the art will be able, for example by carrying out simple comparative tests and using means with which he is familiar, to adjust, as a function of the material and/or the surface of the inlaid or standing yarns and/or the plastics material used, optimum adhesiveness allowing setting of, on the one hand, a secure form-fitting bond of the total system consisting of the knitted fabric with inlaid or standing yarns and the plastics material and, on the other hand, suitable extraction of the inlaid or standing yarns from the knitted fabric and/or the plastics material at the desired point in time, i.e. at a predefined level of the force acting on the inlaid or standing yarns.

It has been found to be particularly advantageous for the inlaid or standing yarns to have a fineness of at least 500 dtex, preferably of approximately 2,000 dtex.

In regard to the knitted fabric used in the invention, the mesh structure consisting of loops has yarns which intersect at an angle of approximately 45° and loop partly around one another at the respective points of intersection. This allows the stretchability of the knitted fabric to be adjusted almost uniformly both in the longitudinal direction and in the transverse direction. Differing stretching properties in the longitudinal or transverse direction of the knitted fabric can thus be adjusted almost completely by way of the orientation of the inlaid yarns in the knitted fabric.

In another exemplary embodiment, a further inlaid or standing yarn, via which further damping can be achieved, is guided within the mesh structure. First, the inlaid or standing yarn described at the outset is subjected to stress and in a further step, before the force is introduced into the mesh structure of the knitted fabric, the further integrated inlaid or standing yarn is subjected to stress. As a result, triple-acting damping by the hinge is achieved using simple means.

In yet another exemplary configuration, the knitted fabric has gaps between the individual yarns having an average diameter of at least 2.5 mm, preferably at least 3.5 mm. This diameter is determined without taking account of the inlaid yarns, but rather simply by measuring the mesh structure generated by the knitted fabric yarns.

In the case of sheathing of the knitted fabric with plastics material on both surfaces of the knitted fabric, it can thus be ensured that, at conventional viscosities of plastics materials of this type in the melted state, the gaps in the knitted fabric are filled almost completely so as to form plastics material webs between the plastics material layers resting on the surfaces of the knitted fabric. This provides a particularly intimate bond of the knitted fabric to the plastics material. Detachment of the airbag flap can therefore reliably be prevented.

A knitted fabric in which the individual yarns have an average diameter of more than 1.0 mm, preferably approximately 1.5 mm, has proven particularly advantageous. Most particularly preferred is a knitted fabric having a fineness of from approximately 100 dtex to approximately 1,000 dtex, for example consisting of plied yarn material Z60 comprising multiple yarns having a strength of 200 dtex. The materials of the knitted fabric consist preferably of polyether, polyamide, aramid or suitable combinations of individual or all of the aforementioned materials.

As was mentioned at the outset, the invention seeks, particularly for the case in which the hinge is arranged in a looped manner between the airbag flap and the frame of the flap, suitably to damp the transition between a translatory movement which then takes place and a subsequent rotatory movement of the airbag flap. In particular, efforts are made to avoid an abrupt introduction of tension with a single tension peak. In an exemplary embodiment of the invention, the stretchability of the knitted fabric and also the forces required for stretching and for at least partial extraction of the inlaid or standing yarns from the knitted fabric, are adjusted in such a way that in the event of triggering of the airbag, at least two defined tension peaks can be measured in the hinge. These at least two tension peaks obviously each have a smaller sum than a single tension peak in the event of abrupt loading of the hinge. This provides a hinge in which the risk of catastrophic material failure is reduced using particularly effective means. A person skilled in the art will infer from the detailed description of the invention a large number of possibilities for adjusting and coordinating the parameters in a suitable manner.

The hinge according to the invention for an airbag may be arranged in the region of a vehicle inner lining and in particular in the region of an instrument panel of a motor vehicle.

Depending on the site of installation of the airbag, the rest position of the airbag flap in relation to the adjacent windscreen, the size of the airbag flap and also the windscreen angle, the folding-open angle is between 5° and 175°.

In a further exemplary embodiment of the invention, the hinge prevents folding-down of the airbag flap through, for example, an angle of greater than 120° from the rest position and in particular prevents contacting of the side window or the windscreen of a motor vehicle by the airbag flap. This prevents the occurrence, if the airbag is triggered, of interactions of the airbag flap with the surrounding region and possibly of avoidable injuries caused, for example, by splinters of glass or plastics material or the like entering the passenger compartment.

Secure operational behavior of the hinge is then reliably ensured in an examplary embodiment of the invention if the hinge displays overall elongation at tear of at least 40% at a tear strength of at least 70 N/cm.

Obviously, although only single hinges consisting of knitted fabric interacting with single airbag flaps have been described, the invention also includes multiple flap systems and/or the use of a plurality of hinges for one or more flaps.

According to a second aspect of the invention, a method for manufacturing a hinge for an airbag flap is provided, in particular for use in a motor vehicle. The method according to the invention includes a suitable arrangement of the knitted fabric comprising inlaid or standing yarns in relation to the airbag flap and also the regions surrounding the airbag flap, so that the inlaid or standing yarns are arranged at an angle of at least 15° in relation to the longitudinal extension of the hinge-side edge of the airbag flap. Subsequently, the knitted fabric is sheathed with plastics material, thus providing a form-fitting connection of the hinge, on the one hand, to the airbag flap and, on the other hand, to the regions surrounding the airbag flap, preferably the edge of the airbag flap. The two regions (the airbag flap on the one hand and the edge of the airbag flap on the other hand) can also merge with each other, it being preferred in such a configuration that the plastics material sheathing be thinner in the region of transition than in the region of the airbag flap or the edge of the airbag flap.

It will in this regard be obvious that the textile hinge can also be sheathed only in those regions in which the connection of the hinge to the airbag cover and the surrounding region is to be established. Those regions of the textile hinge that lie between the airbag cover and surrounding region remain entirely free of sheathed plastics material. Particularly when the hinge is fitted in the form of a loop, it is entirely possible for parts of the textile hinge that remain free of plastics material to make up significant proportions of the area that may be more than 50% of the total surface area of the knitted fabric. Nevertheless, the idea of the invention also includes such a configuration of the knitted fabric.

The knitted fabric can be sheathed with plastics material in any manner known to a person skilled in the art. Moreover, the term "sheathing" does not necessarily refer to the application of a liquid plastics material under pressure. On the contrary, the idea of the invention includes any form of the application of plastics material leading to a form-fitting connection of the knitted fabric to the plastics material. Sheathing of the knitted fabric in an injection-moulding machine is however preferred.

In view of the above, the knitted fabric is manufactured in a suitable manner, provided with the inlaid yarns, subsequently cut to size and optionally provided with receiving holes for receiving fixing pins of an injection-moulding machine. This ensures that the sheathing with plastics material is carried out without the risk of the knitted fabric slipping.

In an exemplary method, a knitted fabric having a fineness of at least 100 dtex and in which the knitted fabric is formed with at least 9 meshes/cm is manufactured. This provides a method which is adapted for manufacturing a hinge which is particularly suitable for the desired intended use.

BRIEF DESCRIPTION OF THE DRAWINGS

The invention will be described hereinafter in greater detail with reference to FIGS. 1 to 3, wherein these illustrative drawings of examplary embodiments of the invention are provided merely for clarificatory purposes and may in no way be used to restrict the scope of protection of the invention such as is defined in the appended claims. In the drawings:

DETAILED DESCRIPTION OF EXEMPLARY EMBODIMENTS OF THE INVENTION

Figure 1:
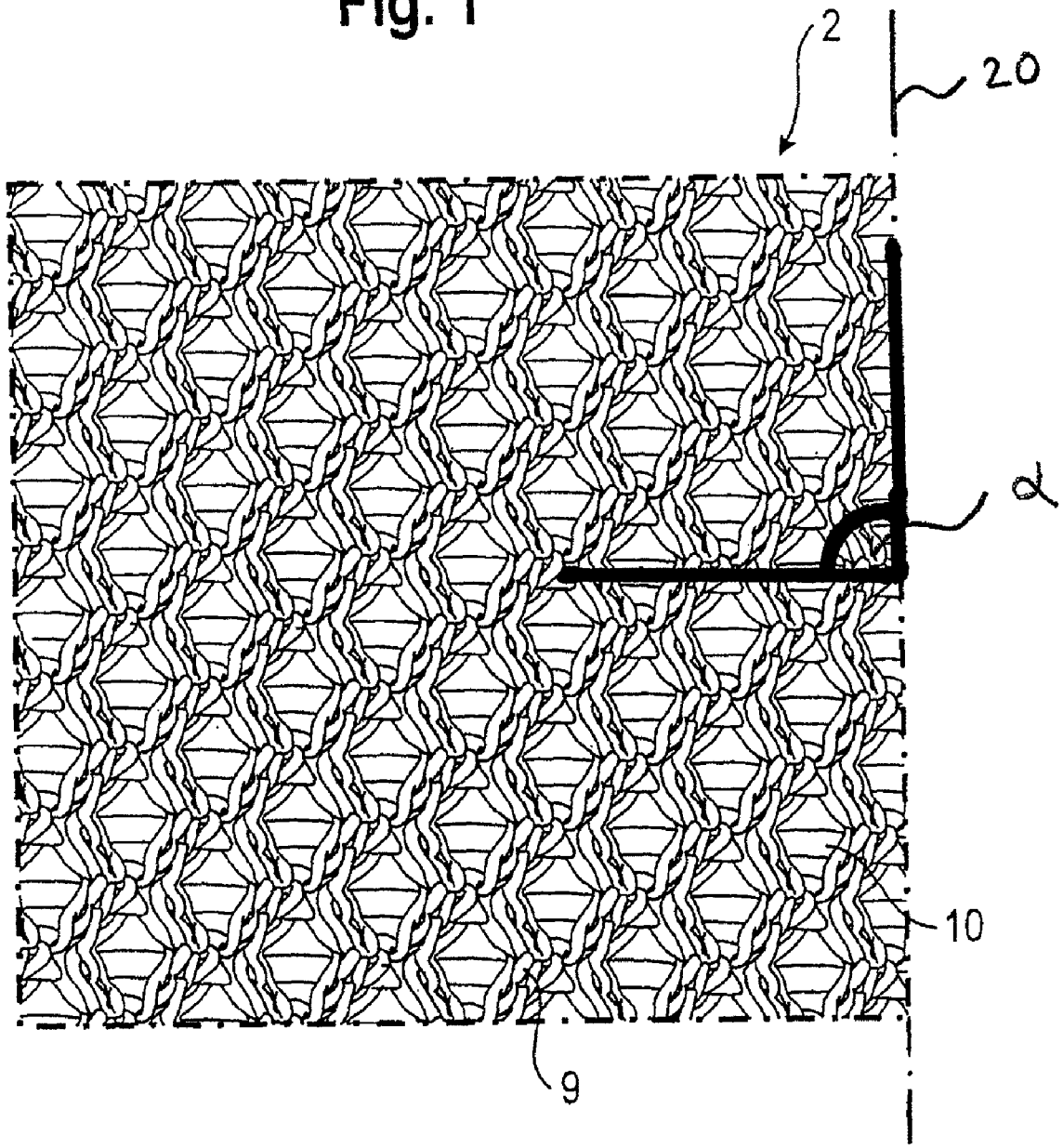
FIG. 1 is a plan view of a first upper side of a knitted fabric for a hinge according to the invention.

FIG. 1 shows an upper side of a knitted fabric 2 for a hinge according to the invention. The knitted fabric 2 consists of meshes, produced on two rails, of a knitted fabric yarn made of polyester having in each case approximately 160 dtex, into which a large number of inlaid yarns 10 arranged parallel to one another are inserted. The inlaid yarns 10 have a yarn strength of 1,000 dtex, leading to a maximum force of approximately 900 N/5 cm and to 40% stretching at maximum force and are arranged at an angle $\alpha$ of 90° in relation to a longitudinal extension of a hinge-side edge 20 of an airbag flap.

Figure 2:
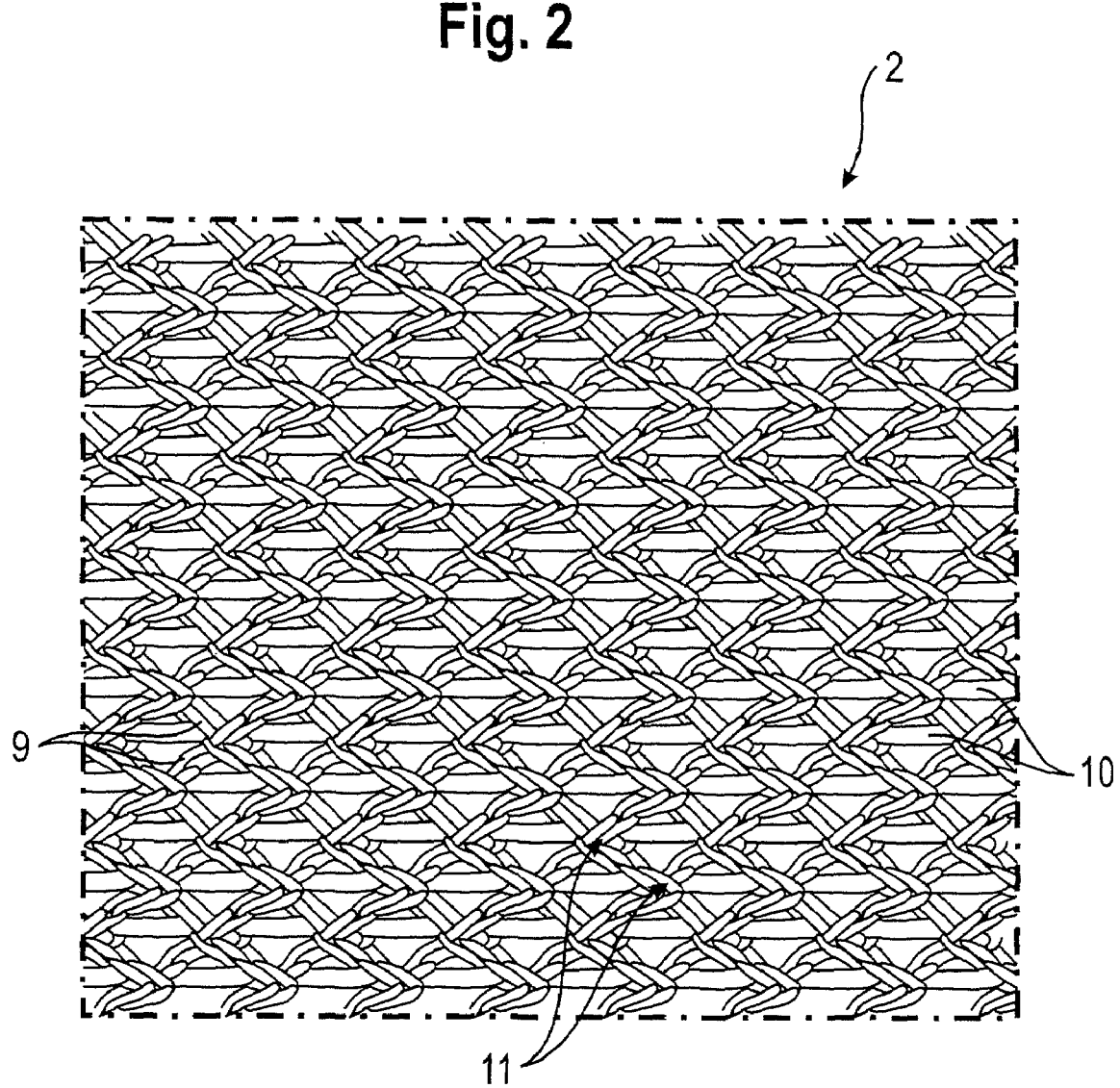
FIG. 2 is a plan view of a second surface, opposing the surface shown in FIG. 1, of a knitted fabric for a hinge according to the invention.

FIG. 2 illustrates the back of the knitted fabric 2 shown in FIG. 1, wherein it may be seen in this case that the inlaid yarns 10 extend through all of the points of intersection 11 which are formed by the knitted fabric yarns 9. The knitted fabric 2 thus forms meshwear in which the inlaid yarns 10 intersect the knitted fabric yarns 9 at an angle of approximately 45° at the points of intersection 11.

Figure 3A:
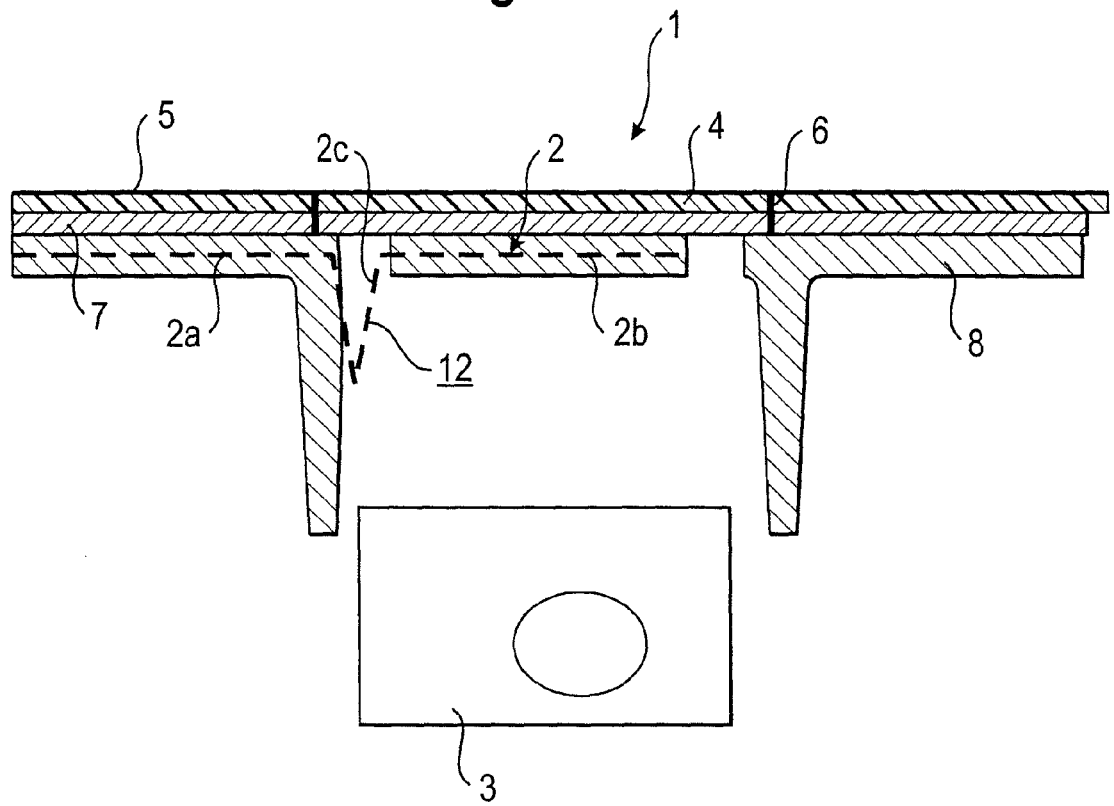
FIG. 3a is a schematic cross section of an instrument panel which is provided with an airbag module and in which the hinge according to the invention is used.
Figure 3B:
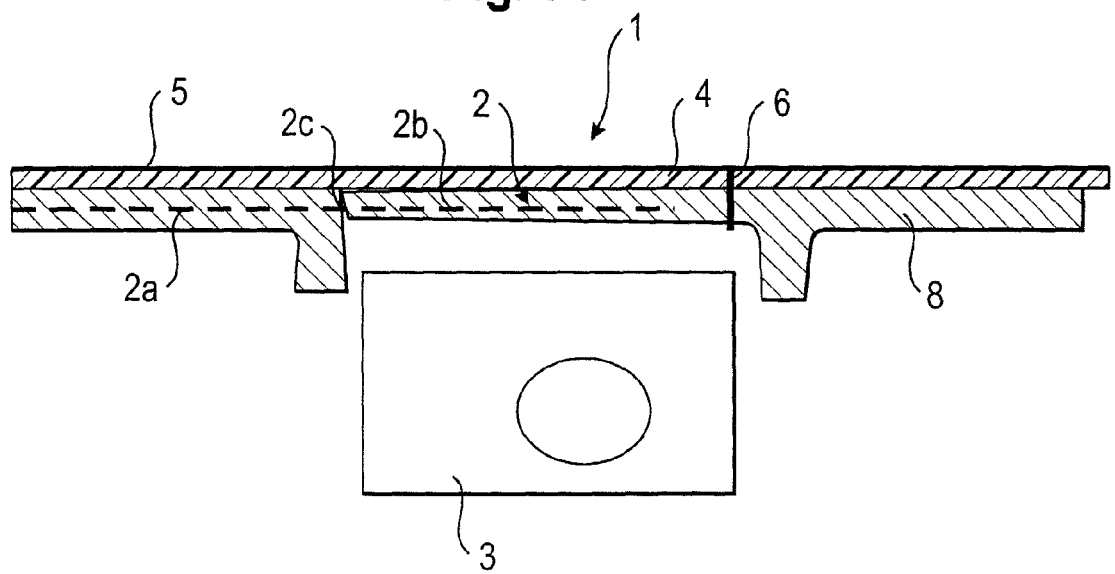
FIG. 3b is a further schematic cross section of an instrument panel which is provided with an airbag module and in which the hinge according to the invention is used.

FIGS. 3a and 3b are schematic cross sections of an instrument panel 1 below which an airbag module 3 is arranged. The instrument panel 1 consists substantially of a decorative carrier 7 with a foam layer 4 and a decorative layer 5 arranged thereabove. In the instrument panel 1, above the airbag module 3 and laterally offset thereto, a weakening region 6 is introduced into the decorative carrier 7 and the foam material 4, as a result of which the instrument panel 1 is torn at the material weakening region 6 on triggering of an airbag (not shown). In order to prevent complete tearing of parts of the instrument panel 1, a hinge in the form of a knitted fabric 2 (shown via the dashed line) is arranged between the airbag module and the decorative material 5. This knitted fabric 2 is sheathed with the plastics material of the decorative carrier 7, at least on its side facing the decorative carrier 7, and consists substantially of a region 2a which is connected to the frame 8 of the airbag in a form-fitting manner and also of a region 2b which is connected to the region of the instrument panel 1 that folds away on triggering of the airbag (not shown). Between these regions 2a and 2b, the knitted fabric 2 additionally has a region 2c which is substantially not sheathed with plastics material and is configured in FIG. 3a in the form of a fold or loop 12.

The airbag flap in FIG. 3a thus extends substantially from the loop 12 up to the weakening region 6 and folds down, on triggering of the airbag (not shown), in particular with translatory and rotatory movement of the region 2c out of the rest position shown. The airbag flap from FIG. 3b, on the other hand, folds down substantially with a purely rotatory movement into the axis of rotation which is defined by the region 2c and extends perpendicularly into the illustrated planes.

The invention claimed is:

1. A hinge for an airbag flap for use in a motor vehicle, the hinge allowing the airbag flap to be folded open or down without tearing the airbag flap in the event of triggering of an airbag arranged below the airbag flap, the hinge comprising:
a knitted fabric sheathed on both surfaces of the knitted fabric by a plastic material and connected in a form-fitting manner both to the airbag flap and to a region adjoining the airbag flap to an instrument panel of the motor vehicle;
wherein, the knitted fabric has a plurality of inlaid or standing yarns arranged at an angle between 15° and 165° in relation to a longitudinal extension of a hinge-side edge of the airbag flap.

2. The hinge for an airbag flap according to claim 1, wherein all of the inlaid or standing yarns are arranged substantially parallel and at a uniform distance from one another in the knitted fabric.

3. A hinge for an airbag flap for use in a motor vehicle, the hinge allowing the airbag flap to be folded open or down without tearing the airbag flap in the event of triggering of an airbag arranged below the airbag flap, the hinge comprising:
a knitted fabric sheathed on both surfaces of the knitted fabric by a plastic material and connected in a form-fitting manner both to the airbag flap and to a region adjoining the airbag flap to an instrument panel of the motor vehicle;
wherein the knitted fabric has a plurality of inlaid or standing yarns and at least a portion of the inlaid or standing yarns are arranged substantially perpendicularly to a longitudinal extension of a hinge-side edge of the airbag flap.

4. The hinge for an airbag flap according to claim 3, wherein all of the plurality of inlaid or standing yarns are arranged perpendicularly to the longitudinal extension of the hinge-side edge of the airbag flap.

5. The hinge for an airbag flap according to claim 1 or claim 3, wherein a resistance of the inlaid or standing yarns to at least partial extraction from the knitted fabric is greater than a force required to introduce substantial longitudinal stretching into the inlaid or standing yarns.

6. The hinge for an airbag flap according to claim 1 or claim 3, wherein the inlaid or standing yarns have a coating with a release agent or adhesion promoter for adjusting the adhesiveness of the sheathed plastics material.

7. The hinge for an airbag flap according to claim 1 or claim 3, wherein the inlaid or standing yarns each have a fineness of at least 500 dtex.

8. The hinge for an airbag flap according to claim 1 or claim 3, wherein the airbag flap is arranged in an inner lining of the motor vehicle, in a region of the instrument panel.

9. The hinge for an airbag flap according to claim 1 or claim 3, wherein the hinge prevents folding-down of the airbag flap through a defined angle from a rest position, to prevent contact with a side window or a windscreen of the motor vehicle.

10. The hinge for an airbag flap according to claim 1 or claim 3, wherein the hinge displays elongation at a tear of at least 40% and at a tear strength of at least 70 N/cm.

11. The hinge according to claim 1 or claim 3, wherein the hinge is made substantially of a textile.

12. The hinge for an airbag flap according to claim 1 or claim 3, wherein the inlaid or standing yarns each have a fineness of approximately 2,000 dtex.

13. The hinge for an airbag flap according to claim 1 or claim 3, wherein the knitted fabric has a mesh structure which consists of loops and has knitted yarns which intersect at an angle of approximately 45° and loop partly around one another at the respective points of intersection.

14. The hinge for an airbag flap according to claim 13, wherein the knitted yarns of the knitted fabric each have an average diameter of more than 1.0 mm.

15. The hinge for an airbag flap according to claim 13, wherein the knitted yarns each have a fineness of approximately 150 dtex to approximately 600 dtex.

16. The hinge for an airbag flap according to claim 13, wherein the knitted fabric has an additional inlaid or standing yarn in the mesh structure.

17. The hinge for an airbag flap according to claim 13, wherein the knitted yarns of the knitted fabric each have an average diameter of approximately 1.5 mm.

18. The hinge for an airbag flap according to claim 13, wherein the plastic material surrounding the knitted fabric by sheathing is provided on top and bottom surfaces of the knitted fabric and also in gaps of the knitted fabric, the gaps formed by the knitted yarns.

19. The hinge for an airbag flap according to claim 18, wherein the gaps have an average diameter of at least 2.5 mm.

20. The hinge for an airbag flap according to claim 18, wherein the gaps have an average diameter of at least 3.5 mm.

21. A method for manufacturing a hinge for an airbag flap for use in a motor vehicle, comprising:
arranging a knitted fabric comprising a plurality of inlaid yarns in relation to the airbag flap and to regions surrounding the airbag flap in such a manner that the inlaid yarns are arranged at an angle between 15° and 165° in relation to a longitudinal extension of a hinge-side edge of the airbag flap,
sheathing both surfaces of the knitted fabric and at least parts both of the airbag flap and the regions surrounding the airbag flap with plastic material so as to form a form-fitting connection.

22. The method according to claim 21, wherein the knitted fabric is produced with a fineness of at least 100 dtex.

23. The method according to claim 21, wherein the knitted fabric is formed with at least 9 meshes per cm.

24. The method according to claim 21, wherein the knitted fabric is sheathed in an injection-molding machine.

25. The method according to claim 24, wherein the knitted fabric is knitted and cut to size.

26. The method according to claim 25, wherein the knitted fabric is subsequently provided with receiving holes for receiving fixing pins of the injection-molding machine.

* * * * *